Feb. 9, 1943.                J. I. BLAIR                2,310,388
                          MOWING MACHINE
              Filed Aug. 2, 1940        5 Sheets-Sheet 1

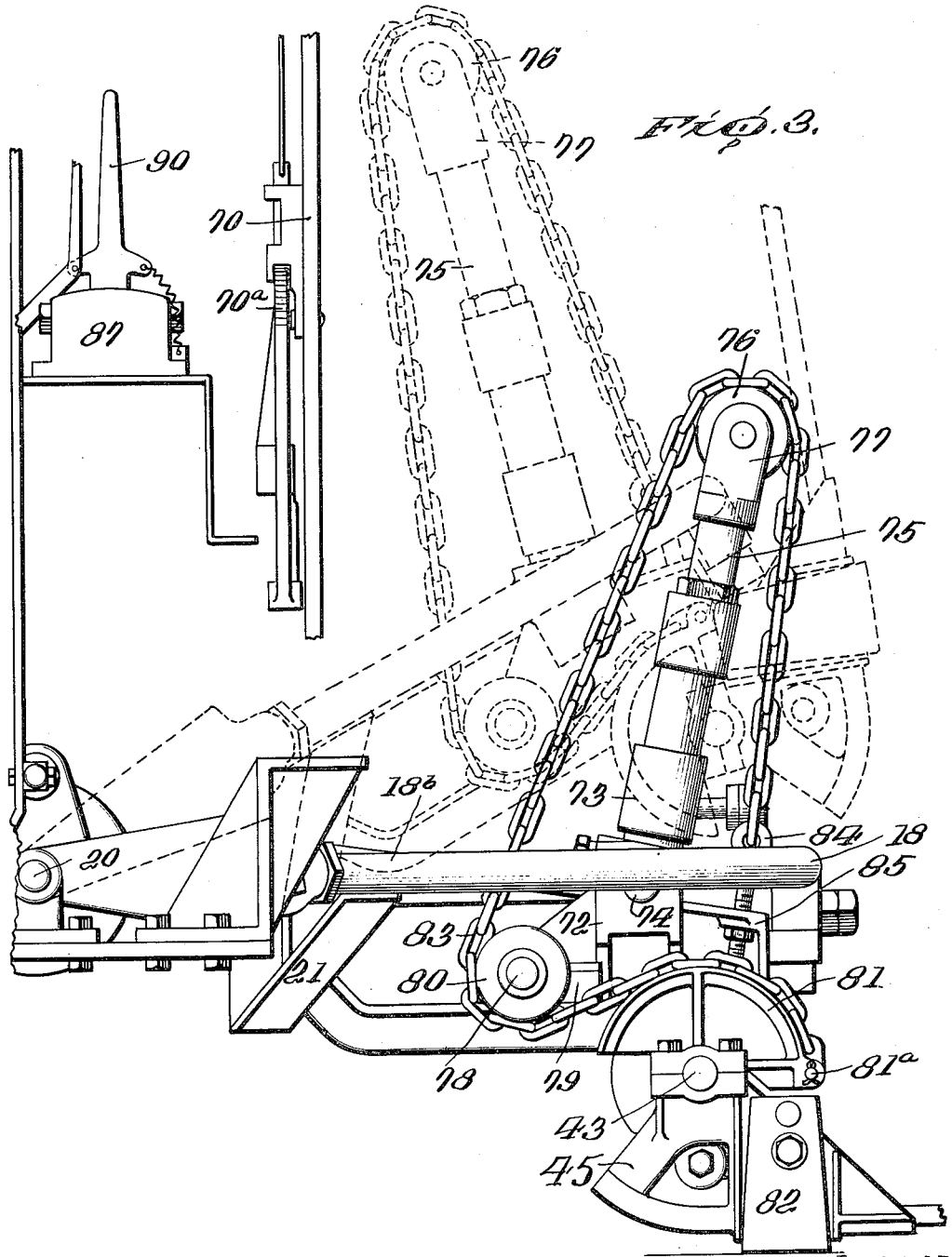

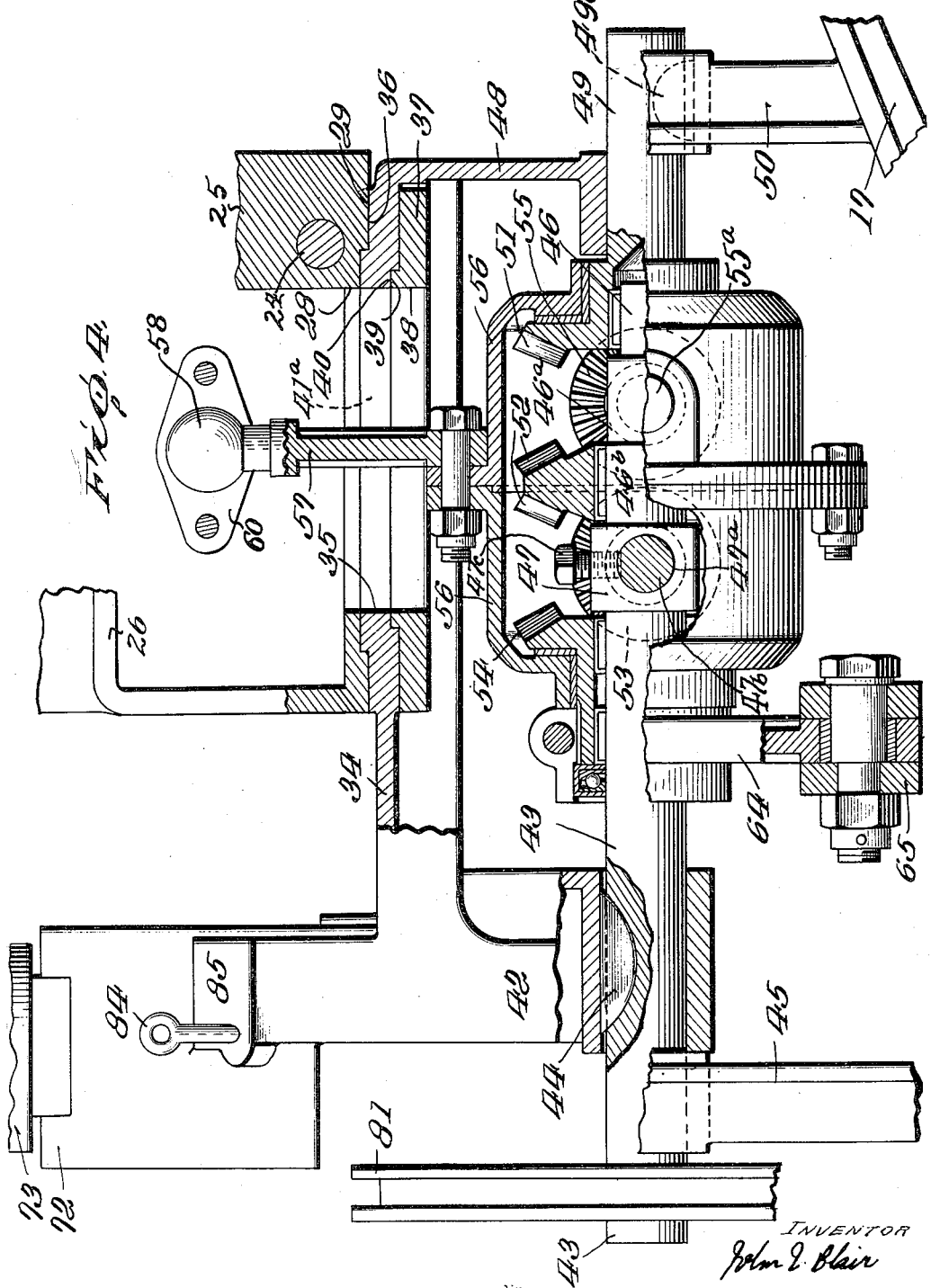

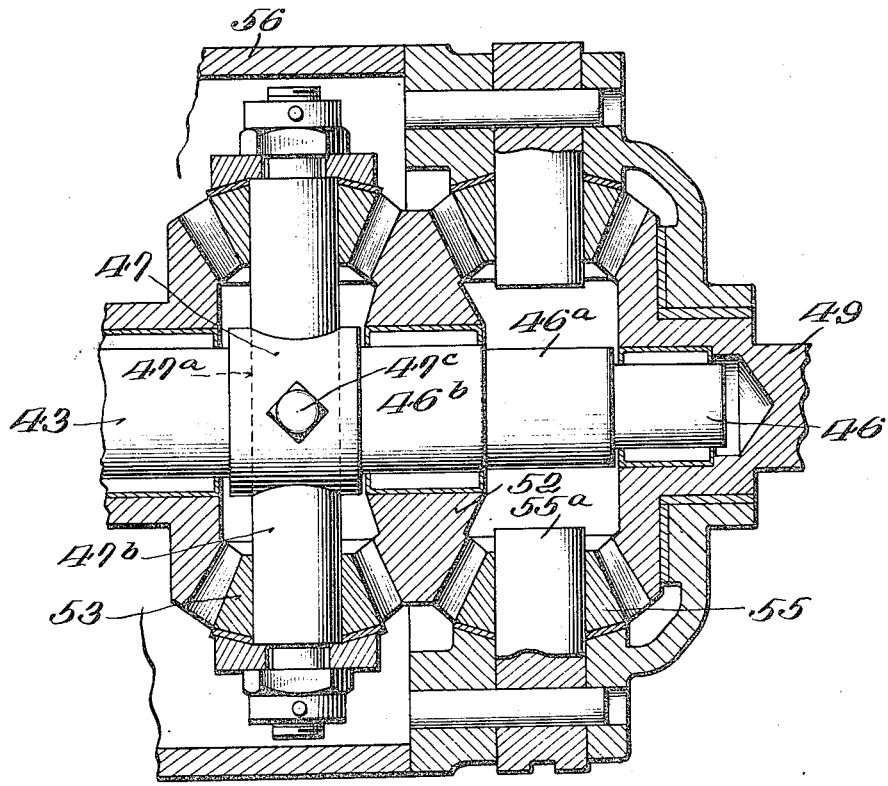
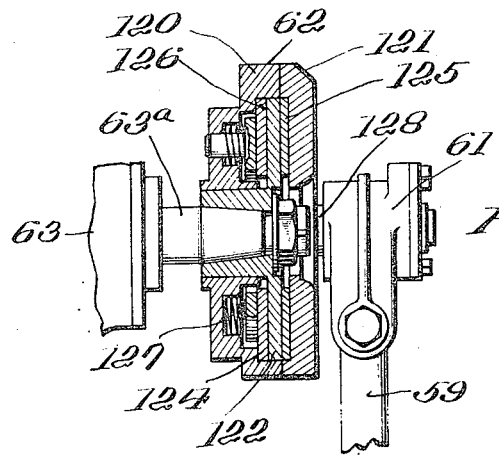

Patented Feb. 9, 1943

2,310,388

UNITED STATES PATENT OFFICE 2,310,388

MOWING MACHINE

John Insley Blair, Stroudsburg, Pa., assignor to Worthington Mower Company, Stroudsburg, Pa., a corporation of Delaware Application August 2, 1940, Serial No. 349,503

9 Claims. (Cl. 56—25)

The present invention relates to new and useful improvements in a mowing apparatus, and more particularly to improvements in a mowing machine of the type which includes a vehicle having a sickle bar associated therewith.

In general, the present invention contemplates the provision of a mowing machine which preferably includes a vehicle of the power operated tractor type and a sickle bar extending laterally therefrom. The vehicle includes a propelling power unit and the sickle bar may be of the conventional type which includes a finger bar and a reciprocable knife bar. The knife bar may be operated from any suitable source of power, but provision is preferably made for operating the knife bar from the vehicle motive power unit through suitable power transmitting mechanism. Operation of the sickle bar can be effected in various angular positions thereof so that vegetation along inclined surfaces can be conveniently cut. Thus, the mowing machine of the present invention is one which is adapted for a wide variety of uses; for instance, as a highway mower where it is necessary to cut vegetation along banks, ditches, shoulders or other inclined surfaces. A safety release is also provided for preventing damage to the driving mechanism when the sickle bar strikes an obstruction or when the knife bar becomes jammed. Provision is also made for effecting various adjustments of the sickle bar for the purpose of adjusting the cutting angle or the cutting height thereof, and the present invention is particularly concerned with these features.

An object of the present invention is to generally improve the adjusting means for the sickle bar of a mowing machine, particularly with respect to the location, ease of manipulation and operation of the adjusting means.

Another object of the present invention is to so construct and arrange the sickle bar adjusting mechanism as to substantially eliminate and prevent any interference with the various movements imparted to the sickle bar during operation and adjustment thereof.

A further object of the invention is to provide a mowing machine wherein the sickle bar adjusting mechanism is mounted relative to the vehicle frame and to the sickle bar in such a manner as to prevent damage to the connections between the adjusting mechanism and the sickle bar during movements thereof.

A still further object of the invention is to provide for angular adjustment of the sickle bar without interfering with operation of the sickle bar and without interfering with the vertical adjustment or swing back of the sickle bar.

A still further object of the invention is to support the sickle bar on a frame which is movable relative to the vehicle and to support an adjusting mechanism on the movable frame for movement therewith and for limited movements with the sickle bar.

The above and other objects of the invention will in part be obvious and will be hereinafter more fully pointed out.

In the accompanying drawings:

Figure 3 is an enlarged rear end view of Figure 1 showing the sickle bar assembly and adjusting mechanism, showing various positions thereof, the dotted line position showing the supporting frame elevated and the sickle bar turned upwardly to a substantially vertical position.

Figure 4 is an enlarged side view of the supporting bracket, partly in section, and showing the power transmitting mechanism partly in section.

Figure 5 is an enlarged fragmentary detail view, showing the pairs of pinion gears with fixed and movable axes.

Figure 6 is an enlarged transverse sectional view of the clutch disk.

Figure 1:
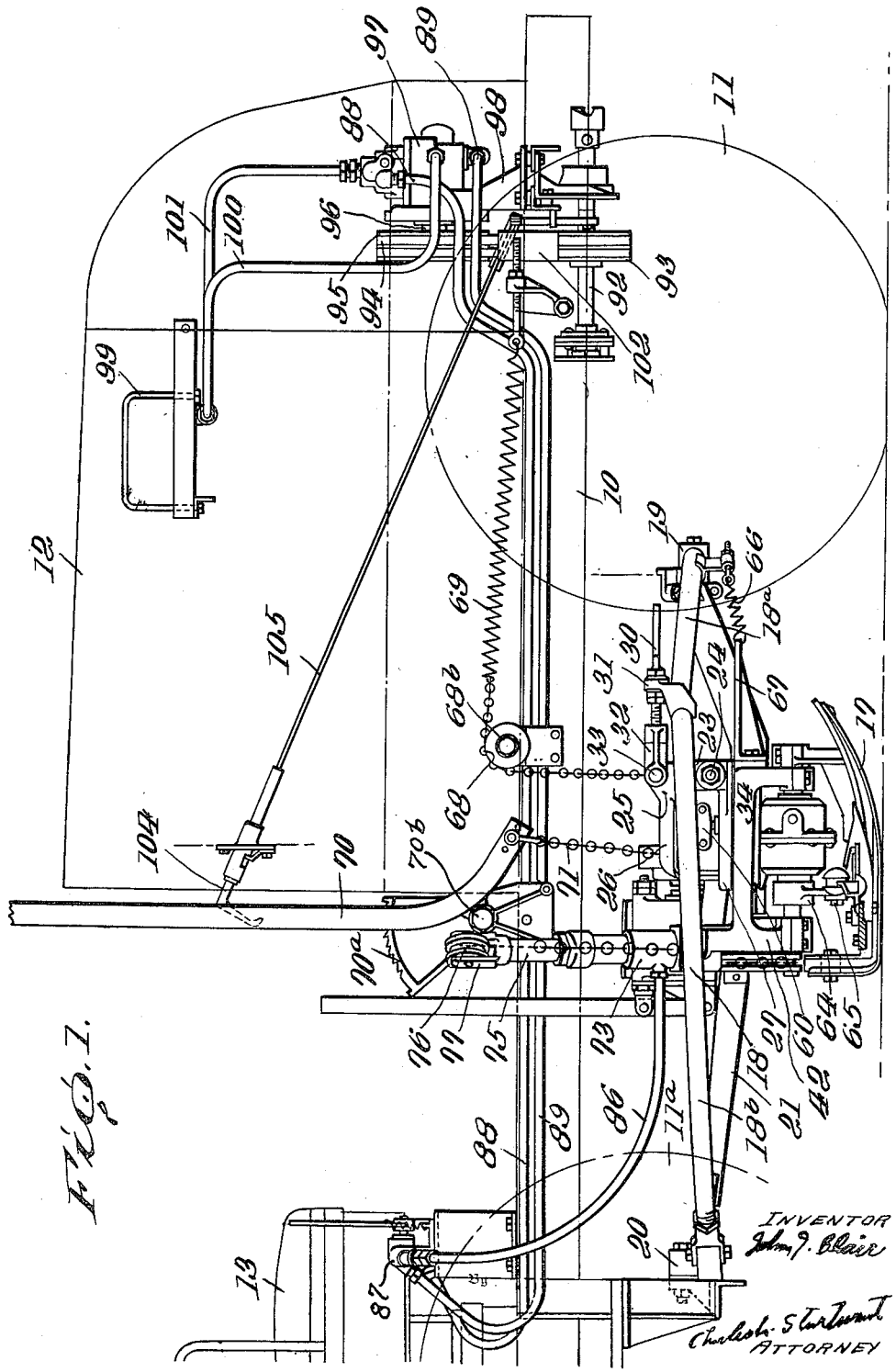
Figure 1 is a side elevation of the sickle bar assembly and the adjusting mechanism and its operating means, but showing a diagrammatic outline of the vehicle and frame and its relation to the sickle bar assembly.
Figure 2:
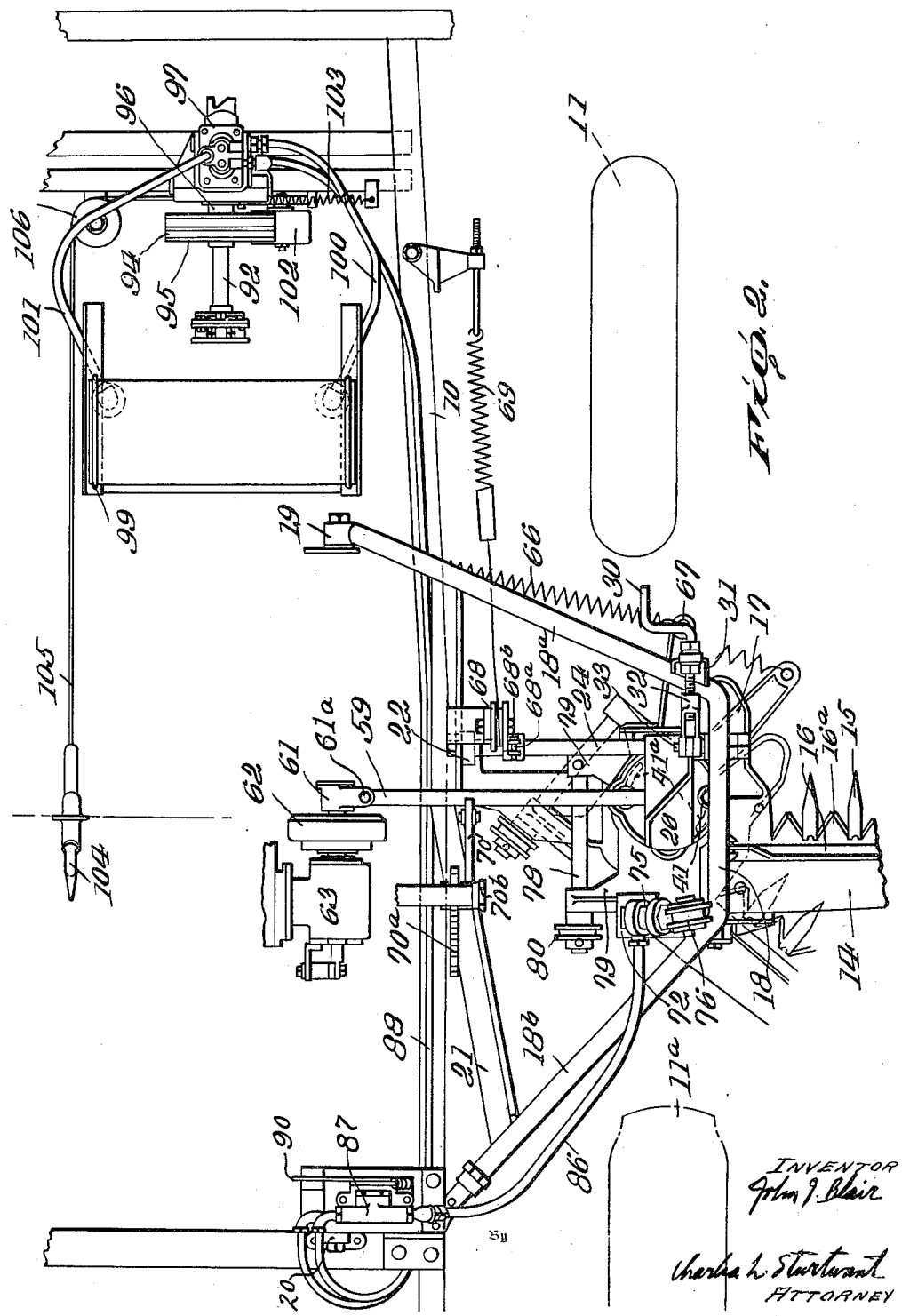
Figure 2 is a fragmentary top plan view of Figure 1 with parts removed for clearness.

Referring more in detail to the accompanying drawings, and particularly to Figures 1 and 2, the vehicle is illustrated diagrammatically as including a supporting frame or chassis 10 which is supporting on front and rear wheels 11, 11a, respectively. The power unit (not shown) may be a conventional internal combustion engine which is disposed at the forward end of the vehicle within the hood 12. A seat 13 for the operator is provided and is located so that the operator has easy access to the various control devices to be hereinafter more fully described.

The sickle bar assembly and power transmitting mechanism are substantially of the type and construction shown and described in the copending application of John I. Blair and Herbert Imbt, Serial No. 341,954. The sickle bar is a conventional type and includes a finger bar 14 having forwardly extending fingers 15, and a reciprocable knife bar 16 having teeth 16a operating between the fingers 15. The finger bar is supported on an inner shoe 17 and the entire sickle bar assembly is illustrated as extending laterally from between the front and rear vehicle wheels. The primary supporting structure for the sickle bar assembly includes a tubular frame 18 having front and rear extensions 18a, 18b, which extend inwardly toward the vehicle frame and are longitudinally and horizontally pivoted, as at 19, 20, respectively, to the frame 10. Thus, the frame 18 is pivoted to the vehicle frame 10 in such a manner that it is free to move vertically with respect to the vehicle.

A brace member 21 has the ends thereof secured to the tubular extensions 18a, 18b, for strengthening the frame 18 and is provided with a lug 22 which is aligned with a depending lug 23 on the member 18. Both lugs are provided with aligned apertures in which a shaft 24 is carried and disposed transversely of the vehicle. A bearing member 25 is journalled on the shaft 24 for tilting movement and includes a cover portion 26 and a base portion 27 which has an aperture 28 therethrough and a depending annular shoulder 29. A crank 30 passes through a bracket 31 on the extension 18a and is threadedly connected to a yoke 32 which is pivotally connected to the bearing bracket 25, as at 33. Manipulation of the crank 30 will change the inclination of the bearing bracket 25 around the shaft 24 so that the inclination of the sickle bar relative to the ground will also be changed. The sickle bar assembly is supported from the bracket 25 in the manner to be hereinafter pointed out.

A shoe supporting bracket 34 (Figure 4) has a top surface which is provided with an aperture 35 registering with the aperture 28 in the bracket 25 and with an annular depressed portion 36 into which the depending annular shoulder 29 fits. A circular plate 37 is disposed beneath the bottom surface of the bracket 34 and is provided with an aperture 38 registering with the apertures 28, 35. The plate 37 is also provided with an upstanding annular rib 39 which fits within an annular recess 40 formed on the under surface of the bracket 34. The base portion 27 of the bearing bracket 25 is secured to the plate 37 by bolts 41 which extend through slots 41a in the bracket 34 so that the bearing bracket 25 and the plate 37 are fixed with respect to each other and form a bearing or swivel connection between whch the bracket 34 can rotate relative thereto (see Fig. 4), as shown by the dotted line position of Figure 2.

The supporting bracket 34 is provided with a depending rear arm 42 having an aperture to receive a supporting shaft 43 which is keyed thereto, as at 44. One end of the shaft 43 extends rearwardly of the arm 42 and has rotatably mounted thereon a bracket member 45 fixed to the rear end of the shoe 17. The opposite end of the shaft 43 is provided with stepped portions 46, 46a, 46b and an enlarged substantially central portion 47 having an aperture 47a therethrough. The stepped portion 46 at the forward end of the shaft 43 terminates short of a depending arm 48 at the forward end of the bracket 34 and the arm 48 has rotatably mounted therein a stub shaft 49 which is keyed as at 49a to an upstanding arm 50 fixed to the forward end of the shoe 17.

The power transmitting mechanism and driving means for the sickle bar will be only briefly described, because it is substantially the same as that shown in the above-mentioned application. Reference is particularly made to Figures 4 and 5 wherein the rear end of the stub shaft 49 is provided with a bevel gear 51 surrounding the stepped portion 46 on the shaft 43. The stepped portion 46b has a double-faced bevel gear 52 loosely mounted thereon for rotation relative thereto. A pin 47b is secured in the aperture 47a by a bolt 47c or the like. The opposite ends of the pin 47b extend beyond the enlarged portion 47 and have pinion gears 53 rotatably mounted thereon and in mesh with the adjacent face of the bevel gear 52 and also with a bevel gear 54 rotatably mounted on the shaft 43. The opposite face of the bevel gear 52 is in mesh with pinion gears 55 which are rotatably mounted on stub shafts 55a which provide moving axes carried by an oil-tight housing 56. This housing 56 incloses the gearing and is mounted outside of the bevel gear 51 and the bevel gear 54 and is oscillatable relative thereto. The pinion gears 55 are also in mesh with the bevel gear 51.

The housing 56 has an upstanding arm 57 extending through the aligned openings in the connection between the bracket 25, the plate 37 and the bearing bracket 34. The arm 57 has a rounded end 58 which is connected to a pitman rod 59 by a ball-and-socket joint 60 below the cover portion 26 on the bracket 25. The opposite end of the pitman rod extends toward the vehicle frame and is connected to a pitman bearing 61 which, in turn, is connected to a crank disk 62. Preferably, the crank disk 62 is of the clutch type shown in the copending application of John I. Blair and Herbert Imbt, Serial No. 294,956, and the crank disk is rotated by means of a conventional power take-off 63. The details of one form of crank disk 62 are shown in Figure 6 wherein the disk includes casing members 120, 121 secured together and providing an internal chamber within which a clutch plate 122 is disposed. This clutch plate is secured to the power take-off shaft 63a and is rotatable therewith. Friction clutch facings 124, 125 are disposed on opposite sides of the plate 122 with the facing 125 engaging the inner surface of the casing member 121 and the adjacent surface of the plate 122. The casing member 120 is recessed to receive separate plates or an annular plate 126 which is pressed by springs 127 against the facing 124 which, in turn, is pressed against the plate 122. The casing member 121 carries an eccentrically mounted stud 128 which is connected to the pitman bearing 61. Thus, any jamming of the knife bar will cause slipping of the clutch to prevent damage to the driving mechanism. The clutch may be located at other places, as, for instance, in the power transmitting mechanism.

Reciprocation of the pitman rod 59 will oscillate the housing 56 with resultant operation of the gears inclosed therein so as to effect the desired reciprocation of the knife bar 16 which is connected to the bevel gear 54 by a depending arm 64 and a pivotal link 65. The rotary motion of the crank disk causes reciprocation of the pitman rod which, in turn, causes oscillation of the housing relative to the shafts 43 and 49. This movement of the housing 56 will cause similar bodily movement of the pinion gears 55 which are carried by the housing and which are in mesh with the bevel gear 51. The bevel gear 51 is carried by the shaft 49 which is fixed to the shoe 17 so that, in any predetermined fixed position of the shoe, the bevel gear 51 is similarly fixed, thus acting as a rack and causing rotation of the pinion gears 55 about their moving axes 55a during bodily movement with the housing. Thus, the bevel gear 52 is oscillated about the stationary shaft 43 and rotation and oscillation of the fixed axis pinion gears 53 will be effected. These pinion gears 53, in turn, cause oscillation of the bevel gear 54 to which the arm 64 is connected so that this arm 64 is oscillated and operates through the link 65 to effect reciprocation of the knife bar. As pointed out in the above-mentioned applications, this power transmitting mechanism permits the sickle bar to be operated in any angularly adjusted cutting position without alteration of the stroke thereof and the differential action of the gearing permits adjustment of the sickle bar to its various cutting positions without stopping the power connection. The pitman connections 60, 61a at the ends thereof permit a swing back or safety release of the sickle bar and the supporting bracket 34 against the action of the spring 66 which is connected to the vehicle frame and to an arm 67 on the bracket 34 when striking an obstruction (see Figure 2). Similarly, the clutch type crank disk will prevent damage to the operating parts when the knife bar becomes jammed.

The supporting frame 18 thus carries the entire sickle bar assembly and, in order to counterbalance the normal tendency of the sickle bar assembly to drop, a chain 68, cable or the like, is connected to the frame 18, as at 68a, and is passed over a pulley 68b on the vehicle frame. A spring 69 is employed for loading the chain and thus counterbalancing the weight of the sickle bar assembly. In order to adjust the cutting height of the sickle bar, a hand lever 70 is pivotally mounted on the vehicle frame 70b and the shorter lever arm is connected to the brace member 21 by a chain 71 or the like. Manipulation of the lever 70 will raise or lower the frame structure 18, 21 and the sickle bar assembly about pivots 19, 20, so that the cutting height of the shoe 17 and the sickle bar above the ground can be adjusted (Figure 3) and maintained by the toothed segment 70a.

In order to adjust the cutting angle of the sickle bar for the purpose of cutting vegetation along inclined surfaces, a hydraulic mechanism is preferably employed. The supporting bracket 34 which is rotatable with respect to the bracket 25 about a substantially vertical axis afforded by the swivel connection, has a socket member 72 formed at the rear end thereof and a hydraulic cylinder 73 is pivotally mounted within the socket on a pin 74. A hydraulic ram or piston 75 is movable within the cylinder 73 and carries a pulley 76 between forks 77 at the free end thereof. A shaft 78 extends longitudinally of the vehicle and is carried by arms 79 which extend inwardly from the bracket 34 toward the vehicle. The rear end of the shaft 78 carries an idler pulley 80 which is spaced below the pivot pin 74 and inwardly thereof toward the vehicle. The rear end of the stationary supporting shaft 43 has a grooved segment member 81 rotatably mounted thereon and thus located forwardly of the idler pulley 80. The segment member 81 is rigidly connected to the shoe 17 by a bracket plate 82 which is thus movable with the shoe. A chain or cable 83 has one end thereof fixed to the segment member 81, as at 81a, and the chain passes over the segment member, then under the idler pulley 80, and over the pulley 76 on the ram 75. The opposite end of the chain 83 is connected to an eye-bolt 84 which is threadedly secured to a bracket 85 mounted between the socket member 72 and the bracket 34. Since the chain 83 is connected by the eye-bolt 84 to the bracket 34, upward movement of the piston 75 will cause rotation of the segment member 81 and the plate 82 and bracket member 45 about the shaft 43 and this will effect counterclockwise, that is, upward movement of the shoe and sickle bar assembly about the shaft 43 and at the same time similar rotation of the shaft 49. Thus, the sickle bar can be moved upwardly (dotted line position of Figure 3) or downwardly through an angle of substantially 180° about the coincident axes of shafts 43, 49 to adjust the cutting angle. The hand lever 70 can be operated to elevate the frame 18 to the dotted line position of Figure 3.

Operation of the hydraulic ram is effected by controlling the passage of fluid under pressure to and from the cylinder 73 through a flexible hose 86 which communicates with the lower part of the cylinder and also with a valve control unit 87. The valve control unit may be of any suitable type for controlling the passage of fluid from a supply line 88 to the hose connection 86 and to a return line 89. The unit is mounted on the vehicle frame and includes a control lever 90 which is conveniently located near the operator's seat 13. The valve unit is constructed so that one position of the lever 90 (central position) will afford communication only between the supply and return lines 88, 89, thus shutting off the hose connection 86 to the cylinder 73 so that the sickle bar assembly can be maintained in any adjusted position. Movement of the lever in one direction will connect the supply line 88 to the hose 86 so as to admit fluid to the cylinder 73 and thus elevate the piston 75 and cause rotation of the sickle bar assembly upwardly in a counterclockwise direction about the axes of shafts 43, 49. Movement of the lever 90 to the extreme opposite position will connect the return line 89 to the hose 86 so as to permit the escape of fluid from the cylinder 73, thus permitting the piston to descend and cause the sickle bar assembly to rotate downwardly in a clockwise direction about the axes of shafts 43, 49.

The fluid pressure system for operating the piston 75 will now be briefly described, reference being had to Figures 1 and 2 of the accompanying drawings. It is to be clearly understood that any suitable system may be employed for the desired purposes. The crank shaft 92 of the vehicle power unit extends forwardly and carries a pulley 93 over which a belt 94 passes. The belt 94 also passes over an upper pulley 95 which is mounted on the drive shaft 96 of a suitable type of oil pump (not shown) within a housing 97. The housing 97 and the inclosed pump mechanism are inclosed within the front part of the hood 12 and are mounted on a suitable bracket device 98. The pressure supply line 88 and the return line 89 extend along the vehicle frame and are in proper communication with the valve housing 87 and the pump housing 97. An oil supply reservoir 99 is carried beneath the hood 12 and is in proper communication with the pump housing through supply and return lines 100, 101.

An idler pulley 102 is pivotally mounted on the bracket device 98 and is adapted to cooperate with the belt 94. A spring 103 normally tends to withdraw the idler pulley 102 from the belt 94 so as to loosen the belt, thus permitting it to slip relative to the pulleys 93, 95. In this manner, the belt and pulley 102 act as a clutch means permitting operation of the mowing machine without constantly running the oil pump. An operating member 104 is mounted on the dashboard and is connected by a cable 105 to the pivoted idler pulley 102. The cable 105 is trained over a pulley 106 on the vehicle frame. When the fluid pressure is needed to operate the hydraulic adjusting mechanism for the sickle bar, the operator can pull out the member 104 so as to bring the idler pulley 102 into tight engagement with the belt 94, and this will tighten the belt and cause operation of the oil pump.

In connection with the adjustment of the cutting angle of the sickle bar, that is, the angular disposition of the sickle bar assembly about the axis of the supporting shafts 43, 49, it is to be particularly pointed out that the adjusting mechanism, whether mechanical or hydraulic, as illustrated, is mounted for movement relative to the vehicle frame during the swing back of the sickle bar assembly and also during the adjustment of the cutting height thereof. Similarly, this adjusting mechanism is movable with the pivoted frame means 18, 21 during rising and falling movements of the sickle bar and shoe 17 as a result of ground undulations. The flexible hose 86 permits relative movement of the piston and cylinder with respect to the vehicle frame.

In any predetermined angular position of the sickle bar assembly, the chain or cable 83 will not be subjected to additional strains during rising and falling of the sickle bar or during any adjustment of the cutting height, because the pulley 80, the pulley 76, the eye-bolt 84 and the chain connection 81a remain fixed relative to each other. Since these elements are supported by the supporting bracket 34, horizontal pivoting of the bracket during the safety swing back of the sickle bar (dotted lines in Figure 2) will not cause additional strain on these connections for the angular adjusting mechanism. Thus, the mechanism for adjusting the cutting angle of the sickle bar is free to move with the sickle bar during its various other movements. Damage to the various connections is thus obviated. The framework 18, 21 is pivoted to the vehicle frame and supports the brackets 25, 34, which, in turn, support the power transmitting gearing and the sickle bar assembly. In addition, the sickle bar assembly and the supporting bracket 34 can pivot relative to the bracket 25 and the framework 18, 21 so as to permit the safety swing back of the sickle bar when an obstruction is encountered. The hydraulic ram and cylinder are mounted on the supporting bracket 34 for movement therewith.

While one form of the invention has been shown for purposes of illustration, it is to be clearly understood that various changes in the details of construction and arrangement of parts may be made without departing from the scope of the invention, as set forth in the appended claims.

I claim:

1. A mowing machine comprising a vehicle adapted to carry a sickle bar, a frame extending outwardly from the vehicle and pivotally connected thereto for limited substantially vertical movement, a supporting member having pivot means extending longitudinally of the vehicle for supporting the sickle bar for angular adjustment, and connected to said frame for substantially horizontal pivotal movement to permit safety swing back of the sickle bar, flexible connecting means between the sickle bar and said supporting member, and hydraulic piston means carried by the supporting member and cooperating with said connecting means to control angular adjustment of the sickle bar about said pivot means.

2. A mowing machine comprising a vehicle adapted to carry a sickle bar, a frame extending outwardly from the vehicle and pivotally connected thereto for limited substantially vertical movement, a supporting member having pivot means extending longitudinally of the vehicle for supporting the sickle bar for angular adjustment, and connected to said frame for substantially horizontal pivotal movement to permit safety swing back of the sickle bar, a socket member carried by said supporting member, a ram carried in said socket member and movable toward and away from the supporting member, and cable means connecting the sickle bar and the supporting member and trained over the end of said ram whereby to effect angular adjustment of the sickle bar about said pivot means.

3. A mowing machine comprising a vehicle adapted to carry a sickle bar, a frame extending outwardly from the vehicle and pivotally connected thereto for limited substantially vertical movement, a supporting member having pivot means extending longitudinally of the vehicle for supporting the sickle bar for angular adjustment, and connected to said frame for substantially horizontal pivotal movement to permit safety swing back of the sickle bar, a cylinder carried by said supporting member and having a fluid pressure operated piston therein, fluid pressure supply and control conduits connected to said cylinder, and means engaging the piston and operable thereby for controlling adjustment of the sickle bar about said pivot means.

4. A mowing machine comprising a vehicle adapted to carry a sickle bar, a frame extending outwardly from the vehicle and pivotally connected thereto for limited substantially vertical movement, a supporting member having pivot means extending longitudinally of the vehicle for supporting the sickle bar for angular adjustment, and connected to said frame for substantially horizontal pivotal movement to permit safety swing back of the sickle bar, a hydraulically actuated piston carried by said supporting member and having a roller at the free end thereof, a grooved segment connected to the sickle bar and having said pivot means as its axis, a pulley carried by the supporting member in the plane of the said segment and spaced laterally therefrom, and a flexible connector secured to the segment and to the supporting member and trained under said pulley and over said roller whereby to effect angular adjustment of the sickle bar about said pivot means upon movement of said piston.

5. A mowing machine comprising a vehicle adapted to carry a sickle bar, frame means connected to the vehicle for supporting the sickle bar, a flexible connection between the frame means and the sickle bar, and actuating means supported entirely by the frame means and engaging the flexible connection intermediate the ends thereof for effecting adjustment of the sickle bar.

6. A mowing machine comprising a vehicle adapted to carry a sickle bar, frame means for supporting the sickle bar and connected to the vehicle for limited substantially vertical movement relative thereto and for horizontal movement to permit safety swing back of the sickle bar, a flexible connection between the frame means and the sickle bar, and actuating means engaging the flexible connection intermediate the ends thereof for controlling and effecting adjustment of the sickle bar and said actuating means being supported entirely by the frame means and movable therewith to prevent damage to the flexible connection.

7. A mowing machine comprising a vehicle adapted to carry a sickle bar, frame means extending outwardly from the vehicle for supporting the sickle bar and capable of limited vertical movement and horizontal movement to permit safety swing back of the sickle bar, said frame means having a pivot extending longitudinally of the vehicle for supporting the sickle bar and permitting adjustment of the cutting angle of the sickle bar about the axis of said pivot, and actuating means supported entirely by said frame means and movable therewith during safety swing back for effecting adjustment of the sickle bar about the axis of said pivot.

8. A mowing machine comprising a vehicle adapted to carry a sickle bar, a frame extending outwardly from the vehicle and pivotally connected thereto for limited substantially vertical movement, a supporting member having pivot means extending longitudinally of the vehicle for supporting the sickle bar for angular adjustment of the cutting angle about the axis of said pivot means and connected to the frame for substantially horizontal pivotal movement to permit safety swing back of the sickle bar, and actuating means carried by and movable with said supporting member and operable to control movement of the sickle bar about the axis of said pivot means whereby to control adjustment of the cutting angle.

9. A mowing machine comprising a vehicle adapted to carry a sickle bar, a frame extending outwardly from the vehicle and pivotally connected thereto for limited substantially vertical movement, a supporting member having pivot means extending longitudinally of the vehicle for supporting the sickle bar for angular adjustment of the cutting angle about the axis of said pivot means and connected to the frame for substantially horizontal pivotal movement to permit safety swing back of the sickle bar, a flexible connection secured to the sickle bar and to the supporting member, and hydraulic actuating means carried by and movable with said supporting member and cooperating with said flexible connection to control movement of the sickle bar about the axis of said pivot means whereby to control adjustment of the cutting angle.

JOHN I. BLAIR.